(12) United States Patent
Ridgdill

(10) Patent No.: US 6,537,014 B1
(45) Date of Patent: Mar. 25, 2003

(54) DUAL TILT TRAILER

(76) Inventor: Thomas Shane Ridgdill, P.O. Box 1252, Moore Haven, FL (US) 33471

( * ) Notice: Subject to any disclaimer, the term of this patent is extended or adjusted under 35 U.S.C. 154(b) by 0 days.

(21) Appl. No.: 09/780,970

(22) Filed: Feb. 10, 2001

(51) Int. Cl.[7] .................................................. B60P 3/06
(52) U.S. Cl. ........................ 414/482; 414/481; 414/483; 280/425.1; 296/181
(58) Field of Search ................................ 414/481, 482, 414/483, 484, 485; 280/425.1; 296/181; 410/3, 30

(56) References Cited

U.S. PATENT DOCUMENTS

| | | | | |
|---|---|---|---|---|
| 3,604,579 A | * | 9/1971 | Jenkins ........................ 411/482 |
| 3,720,336 A | * | 3/1973 | Murray et al. .............. 298/8 R |
| 3,731,831 A | * | 5/1973 | Huff ........................... 280/494 |
| 3,807,593 A | * | 4/1974 | Bourton ...................... 280/400 |
| 3,817,556 A | * | 6/1974 | Nyman ........................ 280/400 |
| 3,945,521 A | * | 3/1976 | Decker ..................... 280/414.1 |
| 4,014,444 A | * | 3/1977 | Jakel ............................ 414/537 |
| 4,032,167 A | * | 6/1977 | Chereda ...................... 280/400 |
| 4,490,089 A | * | 12/1984 | Welker ..................... 280/43.11 |
| 5,016,896 A | * | 5/1991 | Shafer ......................... 280/400 |
| 5,059,085 A | * | 10/1991 | Koller ...................... 280/425.1 |
| 5,362,195 A | * | 11/1994 | Wanger ....................... 280/789 |
| 5,540,538 A | * | 7/1996 | Head, Sr. ..................... 280/400 |
| 5,924,836 A | * | 7/1999 | Kelly .......................... 280/402 |
| 6,086,082 A | * | 7/2000 | Andol ......................... 150/166 |

FOREIGN PATENT DOCUMENTS

WO          93/25406          * 12/1993

* cited by examiner

Primary Examiner—James W. Keenan

(57) ABSTRACT

Ready loading and unloading of objects are provided for by providing for alternating tilting of a bed of a dual tilt trailer in a first loading direction and in a second unloading direction. Ideally, the loading and unloading occur at opposing corners of the dual tilt trailer. This provides for a diagonal orientation of the object during all contact with the dual tilt trailer. Various safety features ensure safe operation of the dual tilt trailer. These include a locking assembly which locks the bed in a level transport orientation during the loading operation when the bed moves from the loading tilted orientation to the level transport orientation and which locks the bed in an unloading tilted orientation during the unloading operation when the bed moves from the level transport orientation to the unloading tilted orientation.

16 Claims, 8 Drawing Sheets

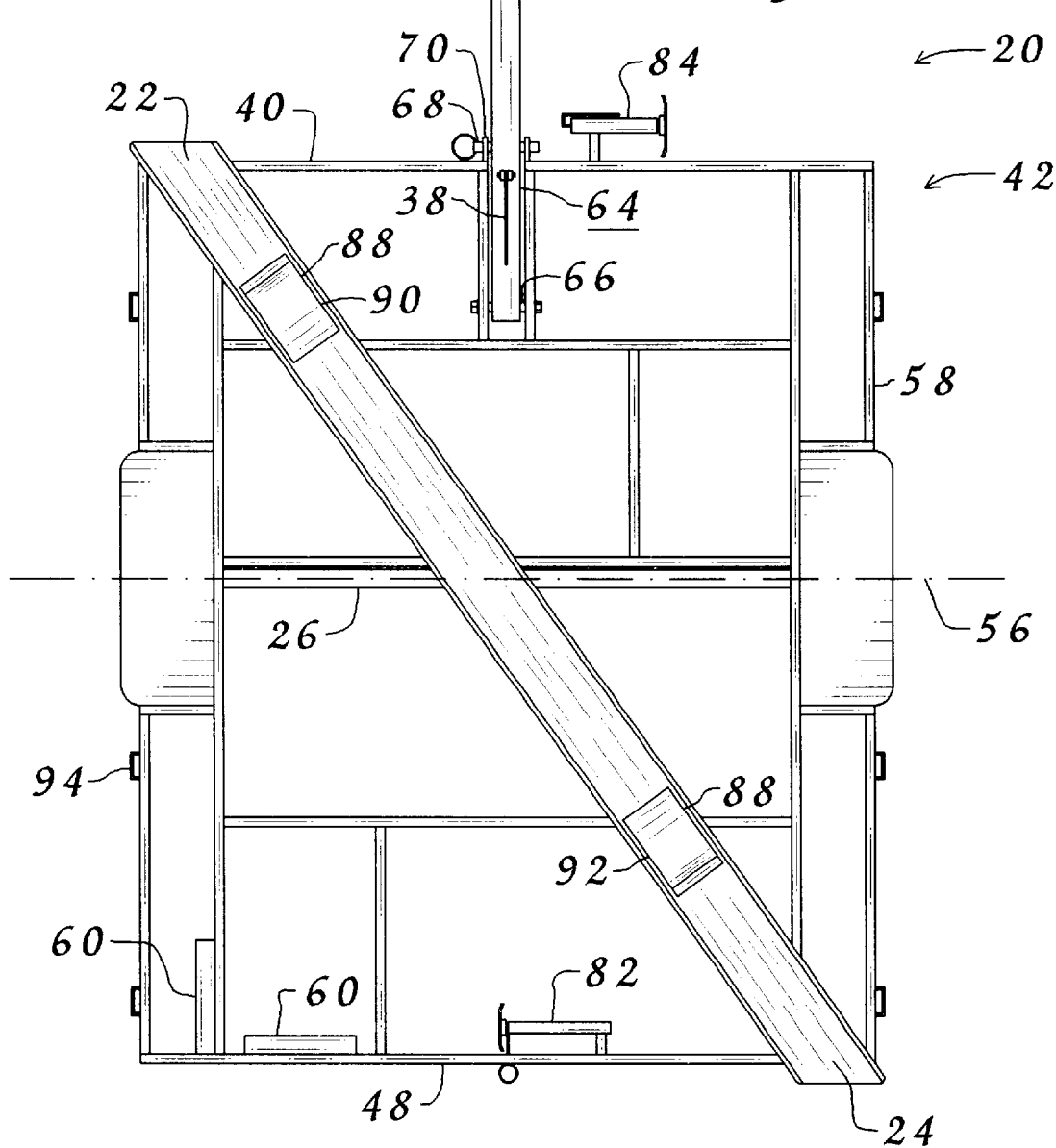

DUAL TILT TRAILER

BACKGROUND

1. Field of the Invention

Generally, the invention relates to towable trailers for transport of movable objects. More specifically, the invention relates to such towable trailers where at least a portion of a bed of the towable trailer tilts in opposing directions from a generally level transport orientation for loading and unloading respectively.

2. Description of the Prior Art

Numerous methods exist to transport movable objects which have a forward direction of conveyance. Examples of such movable objects include wheeled, tracked or skid equipped objects. Such objects may be intended for transport of at least one person or may have another primary intent where the object is controlled by a person and where the person is not physically being carried by the object. Examples of such objects include motorized objects which either convey the operator or which are controlled by the operator while the operator remains in close proximity to the object. Examples of such motorized objects include motorcycles, transport vehicles having three or more wheels, snowmobiles, lawnmowers of either the ridable type or the walk behind type and various other ridable or walk near controlled equipment. Examples of such objects further include non-motorized objects such as bicycles which convey the operator as well as wheel barrels and other conveyance objects.

Typically, these methods of transport involve either placing at least a portion of the movable object unto a bed of a wheeled vehicle, where the bed is either part of the vehicle proper or exists on a towable trailer or placing at least a portion of the movable object in or on a hanging coupling assembly where the hanging coupling assembly is mounted to a transport vehicle.

The method of transport relevant to the present invention involves placing the entire movable object unto the bed of a wheeled towable trailer where the towable trailer is pulled behind a tow vehicle. Trailers of this method will either have fixed beds with displaceable ramps to provide for ready access to the bed of the trailer or will have tilting beds where a rearward end of the bed tips down to provide for ready access to the bed of the trailer. A few designs have been proposed where dual tilting occurs to provide for selective access to both the forward end of the bed or the rearward end of the bed.

Various deficiencies exist with conventional towable trailers which tilt rearward from a level transport orientation to provide for a near intersection of the ground surface and the bed of the towable trailer. While this arrangement provides for easy access to the bed of the towable trailer for loading or unloading of a movable object, that movable object must move in a reverse direction during either the loading or, more commonly, the unloading operation. This provides for an awkward operation at best and a dangerous operation at worst. As an example, when a motorcycle is being transported the motorcycle may be driven in a forward direction utilizing the power of the motorcycle onto the towable trailer. But when the motorcycle is to be unloaded the motorcycle must be rolled backward which may be dangerous given the angle of incline required to reach the ground surface from the elevated bed of the towable trailer. If during this operation the operator encounters a problem the motorcycle may fall over harming the operator or damaging the motorcycle, the trailer or both. Ideally, when transporting a motorcycle multiple person will cooperate during at least the unloading operation to reduce the risk of damage to the motorcycle or the trailer and injury to the operator or operators. When transporting movable objects, and particularly objects such as a motorcycle, often only the operator will be present during the loading operation and the unloading operation. This is often the case during transport of a motorcycle due to the desire to ride the motorcycle at the destination. This sole operator arrangement adds to the danger to the operator in that they then may be injured during the loading operation or the unloading operation and be alone.

As can be seen various attempts have been made to provide for ready transport of movable objects on towable trailers. These attempts have been less efficient than desired. As such, it may be appreciated that there continues to be a need for a towable trailer where a bed of the trailer may be tilted in a first direction where a first end of the bed of the trailer may be accessed from ground level for loading of an object in the most convenient direction of motion for that specific object then where the bed may be tilted to a level transport orientation for transport of the object then where the bed may be tilted in a second direction where a second end of the bed of the trailer may be accessed from ground level for unloading of the object in the same direction of motion of the object used during the loading. The present invention substantially fulfills these needs.

SUMMARY

In view of the foregoing disadvantages inherent in the known types of transport trailers, your applicant has devised a method of loading and unloading movable objects utilizing a forward direction of conveyance of the movable object. This method involves providing a dual tilt trailer which provides for a forward direction of conveyance loading of the movable object onto the dual tilt trailer while the dual tilt trailer is attached behind a tow vehicle and a transport of the movable object upon the dual tilt trailer while the dual tilt trailer remains attached behind the tow vehicle and a forward direction of conveyance unloading of the movable object from the dual tilt trailer while the dual tilt trailer remains attached behind the tow vehicle. The forward direction of conveyance loading and the forward direction of conveyance unloading of the movable object each utilize the forward motion of the movable object. The dual tilt trailer has a ground support assembly, a bed assembly, a tongue assembly and a coupling assembly. The ground support assembly has opposing wheels with the wheels in contact with a ground surface. The bed assembly is attached to the ground support assembly. The bed assembly has a support surface to support the movable object. The support surface has a first end and a second end located on opposing ends of the ground support assembly. The tongue assembly provides for a subsequent attachment of the dual tilt trailer to the tow vehicle. The coupling assembly provides for an attachment of the tongue assembly to the bed assembly. The coupling assembly has a transport position, a first pivoted position and a second pivoted position. The transport position provides for retention of the support surface of the bed assembly in a generally level transport orientation. The first pivoted position provides for positioning of the first end of the support surface of the bed assembly in close proximity to the ground surface where access from the ground surface is provided to the support surface for the forward direction of conveyance loading of the movable object onto the support surface of the bed assembly. While in this position the second end of the support surface of the bed assembly is significantly elevated above the ground surface. The second pivoted position provides for a positioning of the second end of the support surface of the bed assembly in close proximity to the ground surface where access to the ground surface is provided from the support surface for the forward direction of conveyance unloading of the movable object from the support surface of the bed assembly. While in this position the first end of the support surface of the bed assembly is significantly elevated above the ground surface.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a dual tilt trailer which may be loaded at one end at ground level and subsequently unloaded at the other end at ground level.

Other objects include;

a) to provide for a diagonal loading, conveyance and unloading wherein the loading and unloading occur at opposing corners of the dual tilt trailer.

b) to provide for a guide track along the bed of the dual tilt trailer to guide the object being conveyed during the loading, conveyance and unloading.

c) to provide for a weight bias wherein, when released, the bed moves to the loading tilted orientation.

d) to provide for a locking mechanism to automatically lock the bed in a level transport orientation following movement from the loading tilted orientation.

e) to provide for a locking mechanism to automatically lock the bed in the unloading tilted orientation following movement from the level transport orientation.

f) to provide for an extremely low riding bed wherein a loading angle of incline and an unloading angle of incline are minimal to make for an easy loading and unloading respectively.

g) to provide for ready accessibility of an operator manipulated control switch wherein the operator may release the locking mechanism to transfer the bed assembly from the level transport orientation to the unloading tilted orientation while at the object being conveyed.

h) to provide for safety features which may act to prevent movement of the bed from a first orientation to an undesired orientation.

i) to provide for a forward wheel block to prevent passage of a wheeled object beyond a desired loading position during the loading operation.

j) to provide for a rearward wheel block to prevent passage of the wheeled object rearward during the unloading operation.

k) to provide for conveyance of a motorcycle utilizing the dual tilt trailer.

l) to provide for a housing having opposing doors to protect the movable object during storage and conveyance of the movable object.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 5 is an overhead plan view of the dual tilt trailer shown in FIG. 1 with the deck plating and the protective cover removed to reveal the construction thereunder.

FIG. 6 is a perspective view of a wheel block.

DESCRIPTION

Figure 1:
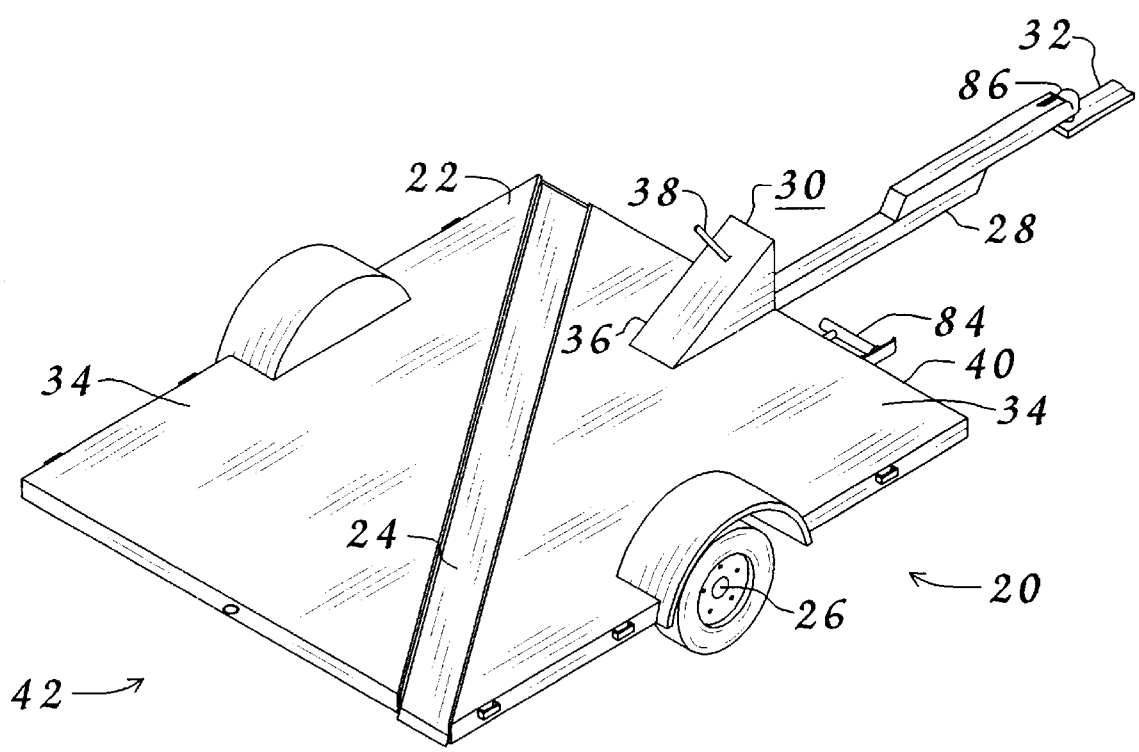
FIG. 1 is a perspective view of a dual tilt trailer in a level transport orientation and attached to a tow vehicle.

Many different trailers having features of the present invention are possible. The following description describes the preferred embodiment of select features of those trailers.

Reference is hereafter made to the drawings where like reference numerals refer to like parts throughout the various views.

Conveyed Objects

Many movable objects may be conveyed utilizing trailers having features of the present invention. Examples of these movable objects include motorized objects which are capable of powering their own motion as well as movable objects which must be manipulated by another power source including human power. Such examples include wheeled objects as well as those having tracks and skids. Such examples include objects which are intended to convey or otherwise carry a person or persons. These include motorcycles, all terrain vehicles, bicycles, go carts and ridable lawnmowers amongst others.

The two examples which follow are designed to convey a motorcycle but many other movable objects may be conveyed. Multiple movable objects may be conveyed on trailers of the present invention. One example involves conveyance of two small motorcycles. Ideally, when a ridable motorized vehicle, such as a motorcycle, is conveyed the dual tilt trailer is configured for convenient unloading of the ridable motorized vehicle in the advent of a breakdown of the tow vehicle where the tow vehicle may be moved onto the shoulder of a roadway. This is easily provided for by having the loading of the ridable motorized vehicle on the trailer occur from the curbside of the trailer where unloading will occur on the traffic side of the trailer.

Dual Tilt Trailer

It is a requirement of the present invention that the trailer have a bed which the movable object may be loaded onto, conveyed on utilizing a tow vehicle and unloaded from. This bed may have various shapes, sizes and configurations. As an example, it may be a large rectangular shape or may be a track member or members into which wheels reside. When a track member is utilized preferably it will be recessed into the bed so that it resides at the lowest possible level to the ground. Ideally, any area not actually utilized by the movable object will be available for storage of accessories or other objects. When a track member is provided for wheels of the movable object it is possible to provide for means to close the track wherein the surrounding surface of the bed and the track cover form a relatively flat surface. This arrangement provides for the trailer to be utilized for other conventional transport uses. Such uses may include utilization of only the rearward tilt of the trailer where a drive on—back off operation occurs for various conveyances.

The loading end ideally will be at the rearward extent of the trailer with the unloading end at the forward extent of the trailer. This arrangement provides for the movable object to be facing forward during conveyance. Alternatively, loading may occur from the forward extent with unloading occurring at the rearward extent. This arrangement will prevent blockage of unloading if the tow vehicle is parked at an awkward angle to the trailer.

It is a requirement that at least the bed be pivotal in opposing directions from a level, or nearly level, orientation while the trailer remains attached to the tow vehicle. Ideally, the bed of the trailer will be as low riding to the ground as possible. This provides for a very slight, ideally less than fifteen degree, angle of incline while in both the loading tilted orientation and the unloading tilted orientation.

FIG. 1 depicts a dual tilt trailer 20 having a bed 22, a guide channel 24, a ground support assembly 26, a tongue assembly 28 and a dual tilt assembly 30. Dual tilt trailer 20 attaches to a tow vehicle 32, only a portion shown in any of the views, for conveyance of dual tilt trailer 20 there behind. Dual tilt trailer 20 further has a deck plating 34 completely covering bed 22 on opposing sides of guide channel 24. Dual tilt assembly 30 includes a protective cover 36 having a control lever 38 extending upward therethrough. Control lever 38 may easily be manipulated by an operator, not shown in any of the views, while on bed 22. This manipulation may occur using a foot of the operator while sitting on a movable object, not shown in this view, being unloaded. Ideally, tongue assembly 28 provides for a relatively wide spacing between a rearward extent, not shown, of tow vehicle 32 and a forward extent 40 of bed 22 of dual tilt trailer 20. This arrangement provides for ample clearance to load, or more preferably, unload the movable object being conveyed from forward extent 40 of bed 22 of dual tilt trailer 20. This arrangement also provides an ideal location on tongue assembly 28 for mounting a spare tire, not shown, for dual tilt trailer 20. Preferably, the movable object is loaded at or near one corner and unloaded at or near the diagonally opposing corner. This example trailer provided for this by having guide channel 24 extend diagonally acrosss bed 22.

Figure 2:
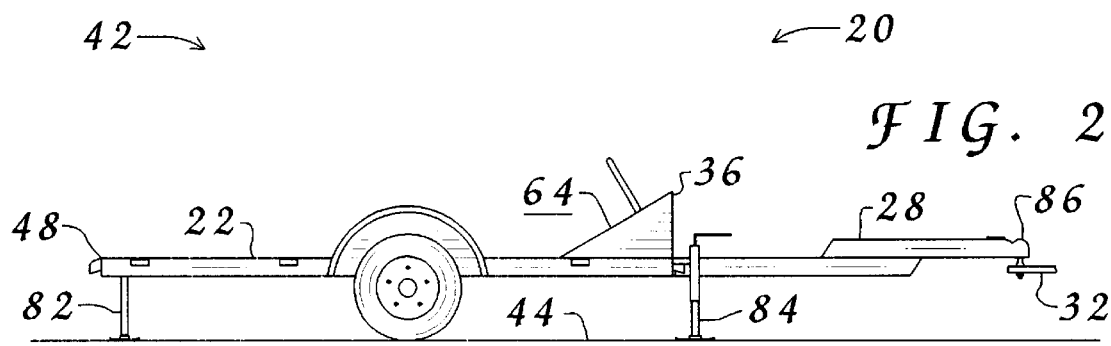
FIG. 2 is an elevational side view of the dual tilt trailer shown in FIG. 1 and in the orientation shown in FIG. 1.

FIG. 2 depicts dual tilt trailer 20 in a level transport orientation 42 wherein transport may occur while dual tilt trailer 20 is attached to tow vehicle 32. While in level transport orientation 42 bed 22 of dual tilt trailer is generally level relative to a ground 44.

Figure 3:
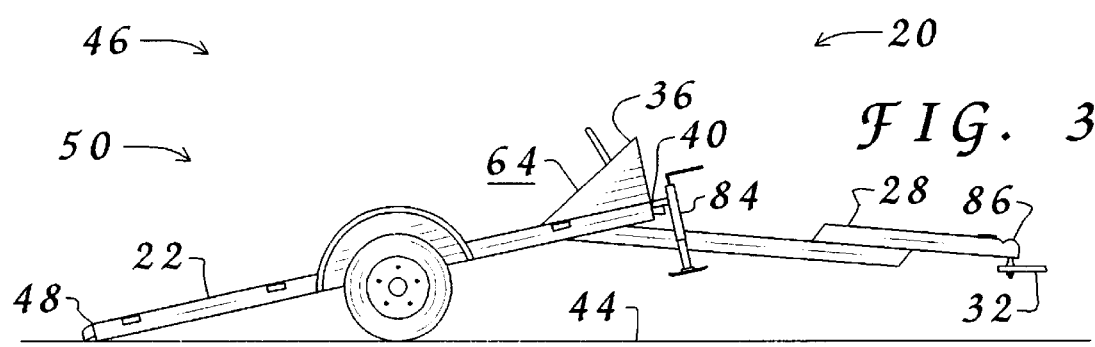
FIG. 3 is an elevational side view of the dual tilt trailer shown in FIG. 2 in a loading tilted orientation.

FIG. 3 depicts dual tilt trailer 20 in a loading tilted orientation 46 wherein loading may occur from a rearward extent 48 while dual tilt trailer 20 remains attached to tow vehicle 32. While in loading tilted orientation 46 rearward extent 48 is in close orientation to ground 44. While in loading tilted orientation 46 bed 22 has a modest angle of incline 50 relative to ground 44. Ideally, this angle of incline 50 is less than fifteen degrees.

Figure 4:
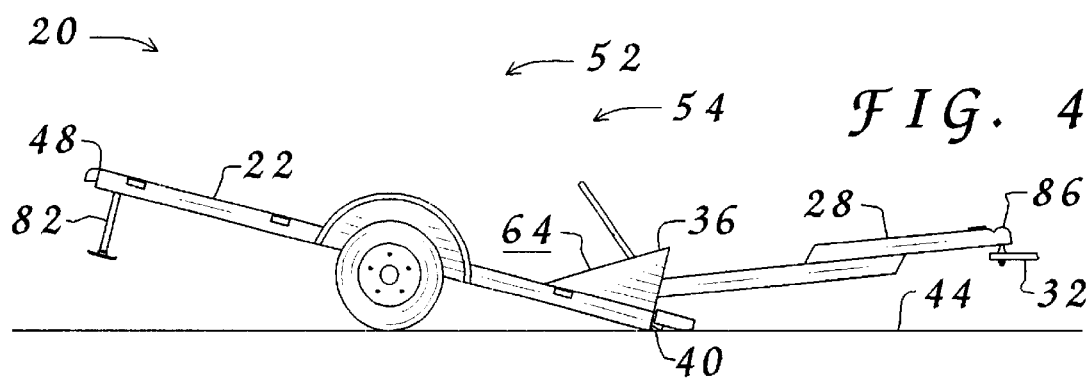
FIG. 4 is an elevational side view of the dual tilt trailer shown in FIG. 2 in an unloading tilted orientation.
Figure 7:
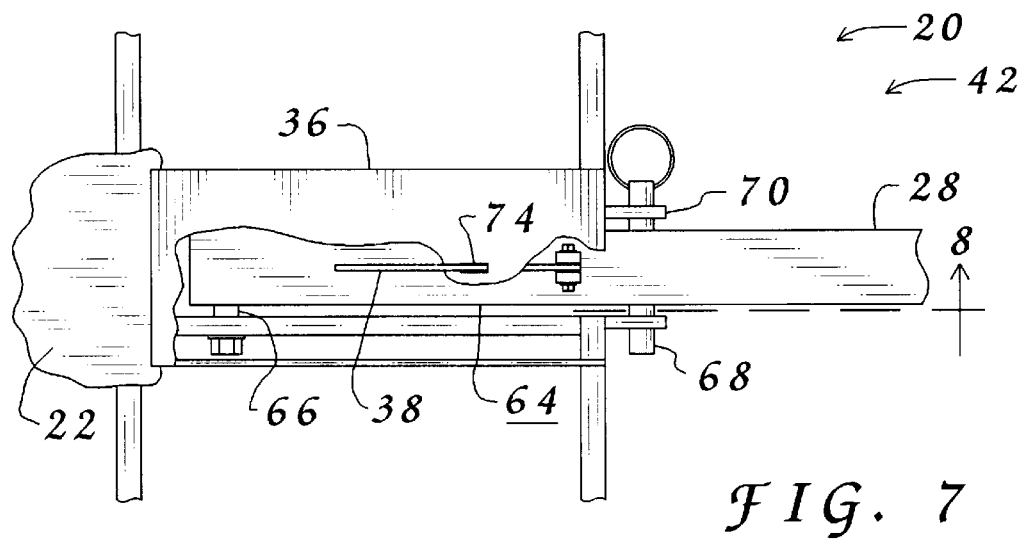
FIG. 7 is a cutaway overhead plan view of the dual pivot assembly in the level transport orientation.

FIG. 4 depicts dual tilt trailer 20 in an unloading tilted orientation 52 wherein unloading may occur from forward extent 40 while dual tilt trailer 20 remains attached to tow vehicle 32. While in unloading tilted orientation 52 forward extent 40 is in close orientation to ground 44. While in unloading tilted orientation 52 bed 22 has a modest angle of incline 54 relative to ground 44. Ideally, this angle of incline 54 is less than fifteen degrees.

FIG. 5 depicts dual tilt trailer 20 where deck plating 34 and protective cover 36, see FIG. 1, have been removed to reveal a preferred configuration concealed thereunder. An axis 56 of ground support assembly 26 provides for pivotal action with ground 44, see FIG. 2 through FIG. 4. A channel iron frame 58 is constructed utilizing conventionally known techniques. It is a desire that it be easy to transfer dual tilt trailer 20 from level transport orientation 42, see FIG. 2, to loading tilted orientation 46, see FIG. 3. Therefore, balance weights 60 have been positioned on channel iron frame 58 to provide the desired bias toward rearward extent 48. Ideally, the movable object being loaded will be moved forward until the weight being loaded biases dual tilt trailer 20 to move from loading tilted orientation 46 to level transport orientation 42, see FIG. 3 and FIG. 2 respectively.

Figure 11:
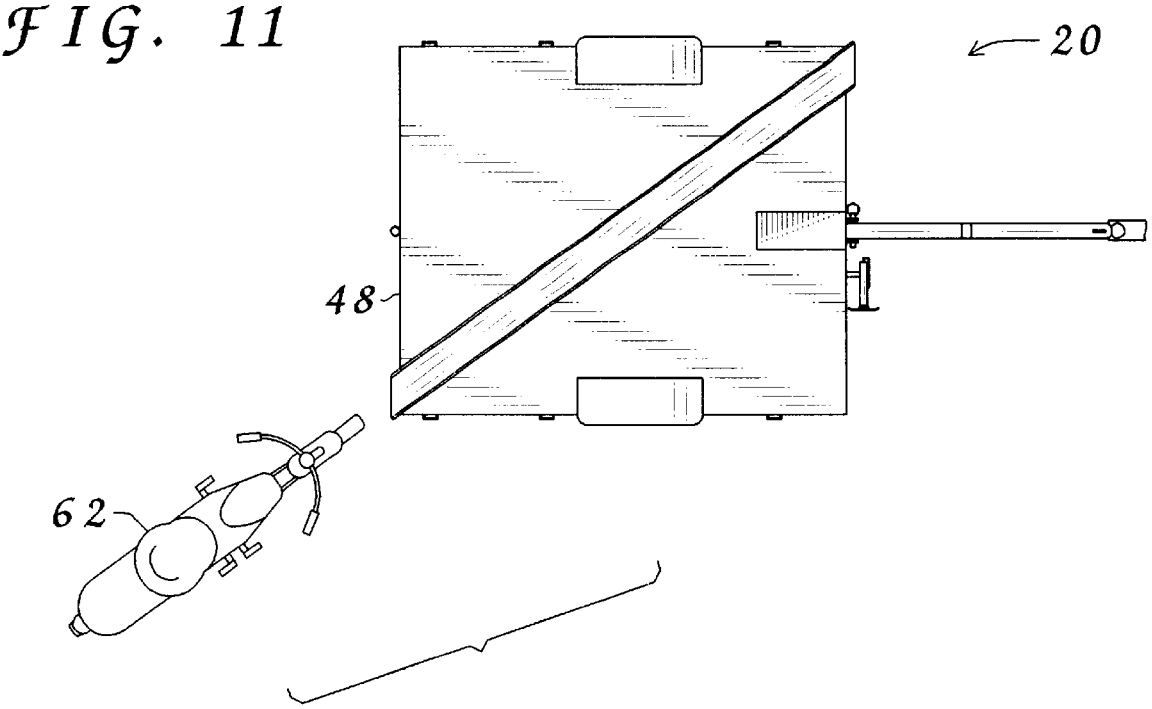
FIG. 11 is an overhead plan view of the dual tilt trailer shown in FIG. 1 with a motorcycle awaiting commencement of the loading operation from a rearward end of the trailer.
Figure 12:
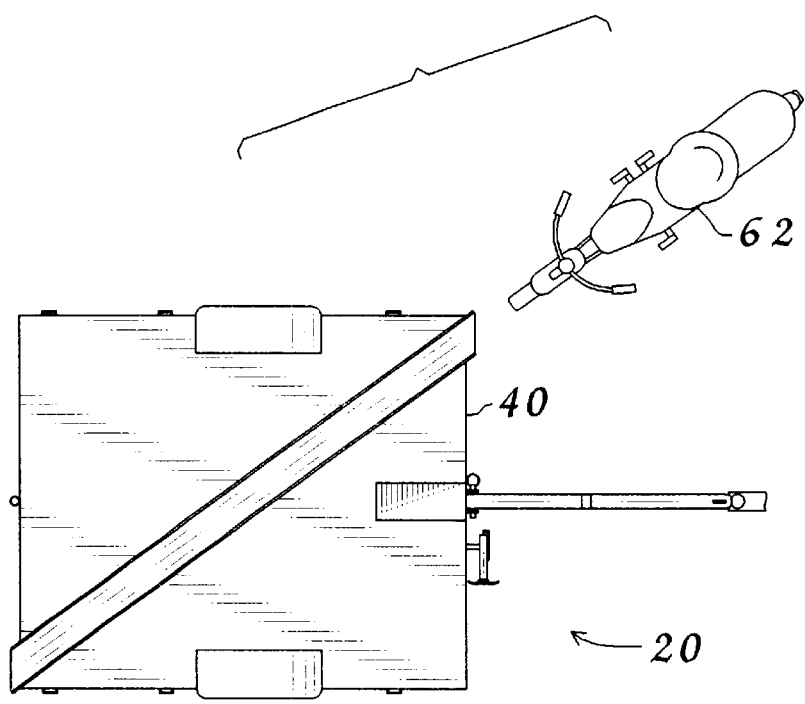
FIG. 12 is an overhead plan view of the dual tilt trailer shown in FIG. 1 with a motorcycle awaiting commencement of the loading operation from a forward end of the trailer.

Preferably, a movable object 62, see FIG. 11, is loaded from rearward extent 48 of dual tilt trailer 20. Alternatively, movable object 62, see FIG. 12, may be loaded from forward extent 40 of dual tilt trailer 20. In either event, when movable object 62 is powered to be self propelled, as is the case of the motorcycle depicted, the operator may use the power of the movable object to perform at least the loading. The same power may be used for the unloading or gravity may be utilized to provide the desired motion. In either event the operator is moving in the natural forward direction of travel with the movable object and not the less convenient and more dangerous rearward direction of travel.

Dual Pivot Assembly

It is a requirement of the present invention that an assembly, or assemblies, be provided which allows for a dual tilting of the bed of the trailer while the trailer remains attached to a tow vehicle. This dual tilting provides for the bed to tilt in a first direction wherein a first end of the trailer may be accessed from a ground level for convenient loading of a movable object onto the bed at that end. This dual tilting further provides for the bed to tilt in an opposing direction from the first direction wherein a second end of the trailer may be accessed from the ground level for convenient unloading of the movable object from the bed from that end. Many different assemblies, or combinations of assemblies, may be employed to provide for this required dual tilting of the bed of the trailer.

In order to accomplish these requirements it is necessary to provide for a pivoting motion somewhere on the trailer. Ideally the entire bed assembly, including the support wheels fixed to the bed, pivot from near an end point of the tongue assembly with this pivoting ideally occurring rearward on the trailer from a forward edge of the trailer. Alternatively, the tongue assembly may be attached relative to the support wheel assembly with a pivoting of just the bed above the support wheel assembly.

Figure 8:
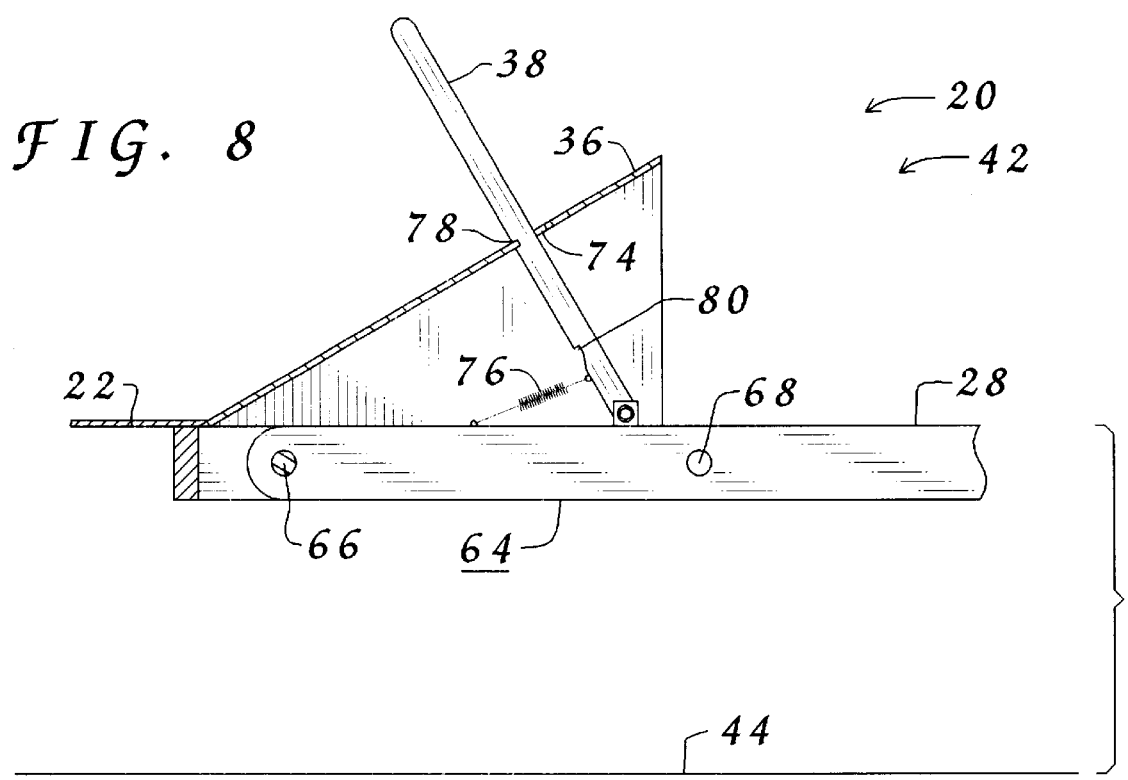
FIG. 8 is an elevational side sectional view of the dual pivot assembly in the level transport orientation as taken from the section line '8' shown in FIG. 7 and positioned relative to the ground.
Figure 9:
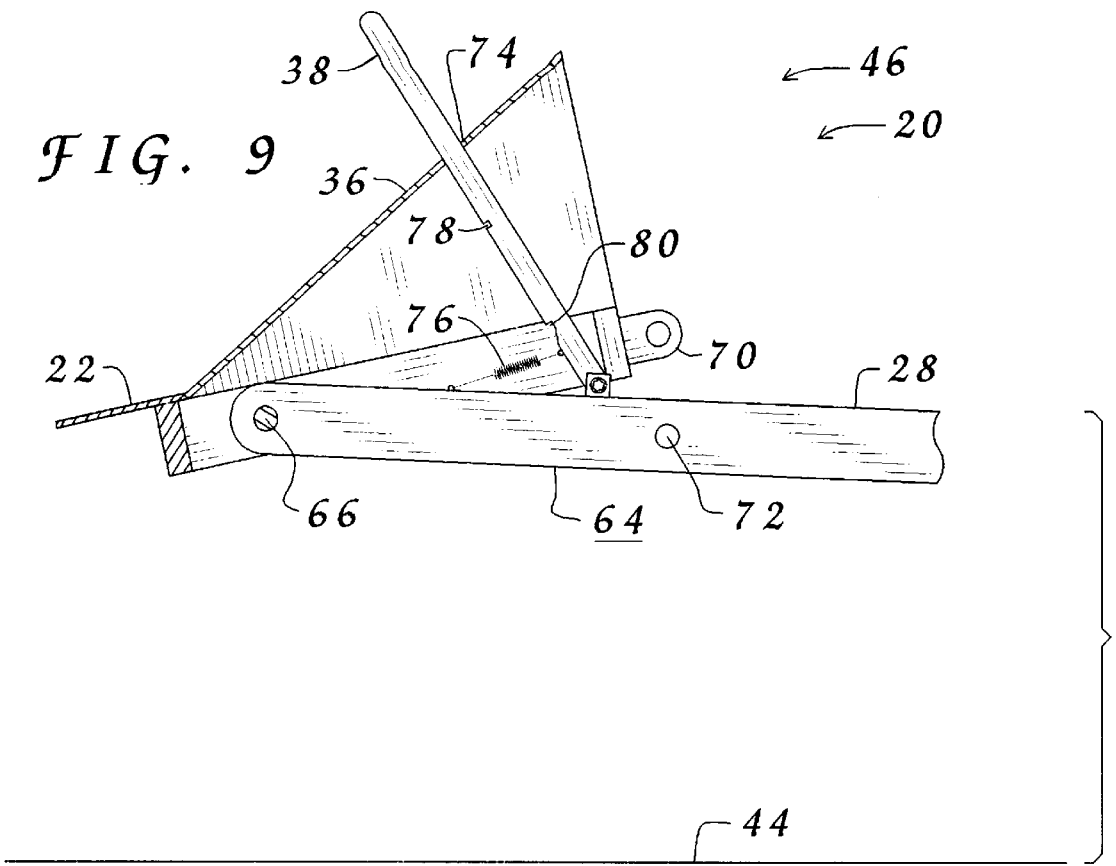
FIG. 9 is an elevational side sectional view of the dual pivot assembly shown in FIG. 8 in the loading tilted orientation and positioned relative to the ground.
Figure 10:
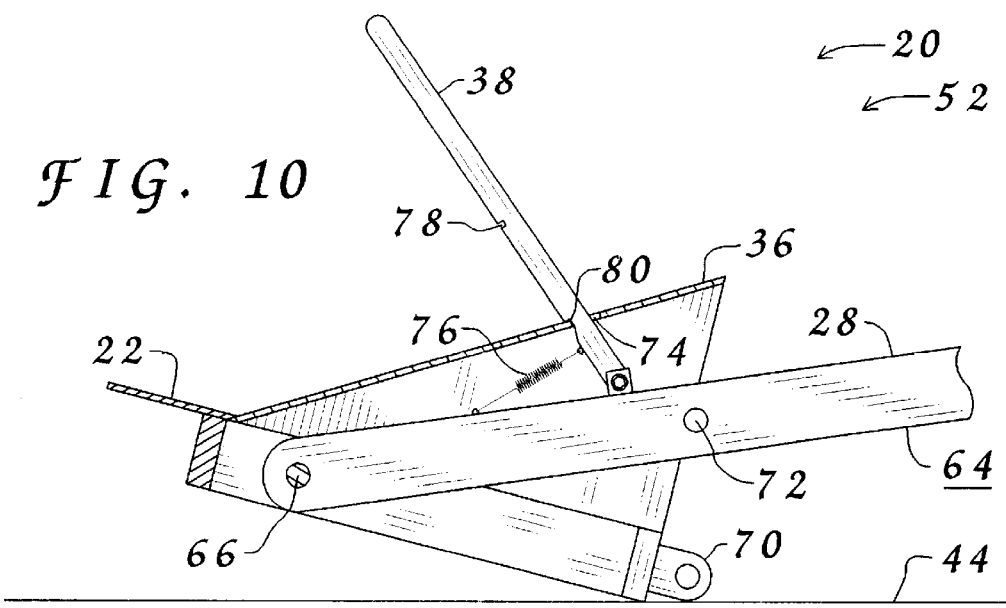
FIG. 10 is an elevational side sectional view of the dual pivot assembly shown in FIG. 8 in the unloading tilted orientation and positioned relative to the ground.

FIG. 1 through FIG. 4 and FIG. 7 through FIG. 10 depict protective cover 36, or portions thereof, partially concealing a dual pivot assembly 64. FIG. 8 through FIG. 10 depict dual pivot assembly 64 of dual tilt trailer 20 positioned relative to ground 44 in the various orientations. Dual pivot assembly 64 provides for transfer of dual tilt trailer 20 selectively between level transport orientation 42, see FIG. 1, FIG. 2, FIG. 5, FIG. 7 and FIG. 8, loading tilted orientation 46, see FIG. 3 and FIG. 9, and unloading tilted orientation 52, see FIG. 4 and FIG. 10. Dual pivot assembly 64 has a pivot shaft 66, see FIG. 5 and FIG. 7 through FIG. 10, which is positioned rearward on dual tilt trailer 20 from forward extent 40, see FIG. 5. Pivot shaft 66 acts between tongue assembly 28 and bed 22 to permit bed 22 to tip rearward or tip forward relative to axis 56, see FIG. 5. A locking pin 68, see FIG. 5, FIG. 7 and FIG. 8 acts to retain dual pivot assembly 64 in level transport orientation 42 while positioned through a locking bracket 70, see FIG. 5 and FIG. 7 through FIG. 10, and a locking aperture 72, see FIG. 9 and FIG. 10, through tongue assembly 28. When so locked dual tilt trailer 20 must remain in level transport orientation 42 for storage or conveyance.

Protective cover 36 has a slot 74 therein through which control lever 38 extends. Control lever 38 pivotally anchors to tongue assembly 28 and is biased by a spring 76, see FIG. 8 through FIG. 10, anchored to control lever 38 and protective cover 36. Control lever 38 has a first engagement slot 78 and a second engagement slot 80, see FIG. 8 through FIG. 10. While first engagement slot 78 engages protective cover 36 dual pivot assembly 64 is retained in level transport orientation 42, see FIG. 8. While second engagement slot 80 engages protective cover 36 dual pivot assembly 64 is retained in unloading tilted orientation 52, see FIG. 10. When bed 22 is biased, by weight distribution, into loading tilted orientation 46 control lever 38 slidably engages protective cover 36, see FIG. 9.

When locking pin 68 is removed and dual tilt trailer 20 is in level transport orientation 42 pressure against control lever 38 against the bias from spring 76 causes bed 22 to move to loading tilted orientation 46. When a movable object is loaded upon bed 22 until the weight distribution of such loading causes bed 22 to move toward level transport orientation 42 first engagement slot 78 engages protective cover 36 to stop bed 22 from moving beyond level transport orientation 42 toward unloading tilted orientation 52.

When locking pin 68 is removed and movable object is positioned on bed 22 with a weight bias toward forward extent 40 pressure against control lever 38 against the bias from spring 76 causes first engagement slot 78 to release from protective cover 36 and bed 22 to move to unloading tilted orientation 52. Once in unloading tilted orientation 52 second engagement slot 80 engages protective cover 36 to retain dual tilt trailer 20 in unloading tilted orientation 52. This prevents bed 22 from moving upward during the unloading operation and potentially damaging the movable object or injuring the operator or bystander.

Safety Features

Preferably various safety features will be provided to ensure safe operation of the trailer during usage. Various safety features are designed into the preferred embodiment of the dual pivot assembly and described above.

A hidden drop down safety leg for unloading ensures that during the unloading operation when the locking mechanism is released that the bed of the trailer cannot tilt in the wrong direction to the loading tilted orientation from the level transport orientation.

A tongue jack provides for easy manipulation of an elevational height of a coupling end of the tongue assembly for attachment and detachment from the tow vehicle. Ideally, due to the weight bias of the bed toward the unloading tilted orientation, the hidden drop down safety leg for unloading will be deployed prior to attachment and detachment from the tow vehicle. The tongue jack may to deployed during the loading operation, when loading occurs from the rear of the trailer, as a safety feature. The elevation may be set while the trailer is in the level transport orientation prior to transfer of the trailer to the loading tilted orientation. Following transfer to the loading tilted orientation the tongue jack will be elevated above the ground. This arrangement will ensure that if the locking mechanism of the dual pivot assembly fails during the loading operation that the bed will not pass through the level transport orientation and go to the unloading tilted orientation.

When a guide channel, or channels, are provided for wheels of the movable object being conveyed a loading wheel block may be provided to prevent the forward wheel of the object from going beyond a desired loading position on the trailer during the loading operation. Similarly, an unloading wheel block may be provided for positioning behind the rear wheel during the unloading operation to prevent the rearward wheel of the object, and therefore the object, from moving rearward during the unloading operation. Both wheel blocks may also be utilized during conveyance of the object to prevent movement of the object. These wheel blocks may be positioned within the guide channel at desired locations depending upon the size, shape and weight distribution of the wheeled vehicle being transported. Various methods may be employed to provide for securement of the respective wheel block relative to the bed or relative to the guide channel. Ideally, the wheel block will have the ability to then secure the wheel of the movable object thereto to further secure the movable object during storage and conveyance.

Tie down attachments may be provided to secure the movable object during conveyance and storage. These may be positioned on the bed or at select locations around the perimeter of the bed.

Preferably a hidden drop down safety leg 82, see FIG. 2, FIG. 4 and FIG. 5, is included as a safety feature for use during the unloading operation. Positioned at rearward extent 48 hidden drop down safety leg 82 would be deployed while in level transport orientation 42, see FIG. 2. Following such deployment when desiring to transfer to unloading tilted orientation 52 dual tilt trailer 20 cannot move to loading tilted orientation 46 if the weight bias is toward rearward extent 48. When returning to level transport orientation 42 from unloading tilted orientation 52 deployment of hidden drop down safety leg 82 prevents dual tilt trailer 20 from moving toward unloading tilted orientation 52.

Preferably a tongue jack 84, see FIG. 1 through FIG. 3 and FIG. 5, is included to provide for easy control over an elevational height of a coupling end 86 of tongue assembly 28 for ready engagement and detachment from tow vehicle 32. Positioned at forward extent 40 tongue jack 84 may also be deployed while in level transport orientation 42, see FIG. 2. Following such deployment when it is desired to transfer to loading tilted orientation 46 dual tilt trailer 20 cannot move to unloading tilted orientation 52 if the weight bias is toward forward extent 40. When returning to level transport orientation 42 from loading tilted orientation 46 deployment of tongue jack 84 prevents dual tilt trailer 20 from moving toward loading tilted orientation 46.

A wheel block 88, see FIG. 5 and FIG. 6, may be used within guide channel 24 as either a loading wheel block 90 or an unloading wheel block 92. Wheel blocks 88 may be positioned and anchored at any desired respective location within guide channel 24. During the loading operation loading wheel block 90 may be positioned to prevent the movable object from going beyond a desired location within guide channel 24. During the unloading operation unloading wheel block 92 may be positioned behind a rear wheel to prevent the movable object from moving rearward instead of the desired forward direction. Wheel blocks 88 may be utilized while in level transport orientation to secure the movable object to dual tilt trailer 20.

Following the loading operation of a movable object onto dual tilt trailer 20 it is advisable to secure the movable object to dual tilt trailer 20. Various tie down attachments 94, see FIG. 1 through FIG. 5, are provided about the perimeter of bed 22 for convenient securement of the movable object as conventionally known in the art.

Enclosed Housing

While dual tilt trailers of the present invention will often be open it is possible to provide for an enclosed housing to protect the movable object from the environment during conveyance and during storage. When an enclosed housing is provided it is a requirement to provide for access to both the loading end and the unloading end of the bed. This is easily accomplished by providing hinged doors at opposing corners of the trailer. Alternatively, doors may be of a sliding or removable type.

Figure 13:
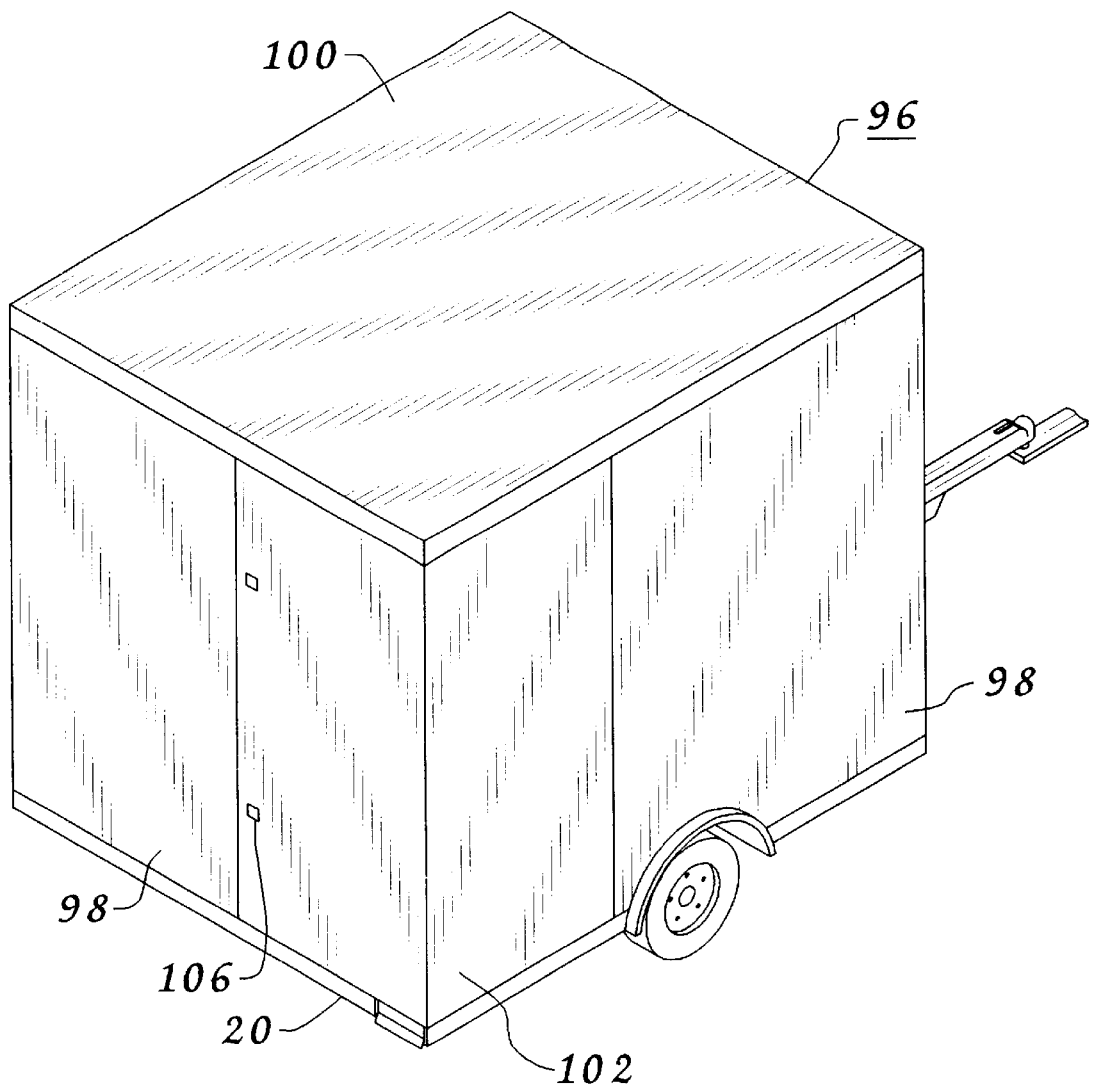
FIG. 13 is a perspective view of a dual tilt trailer having a housing and in a closed orientation.
Figure 14:
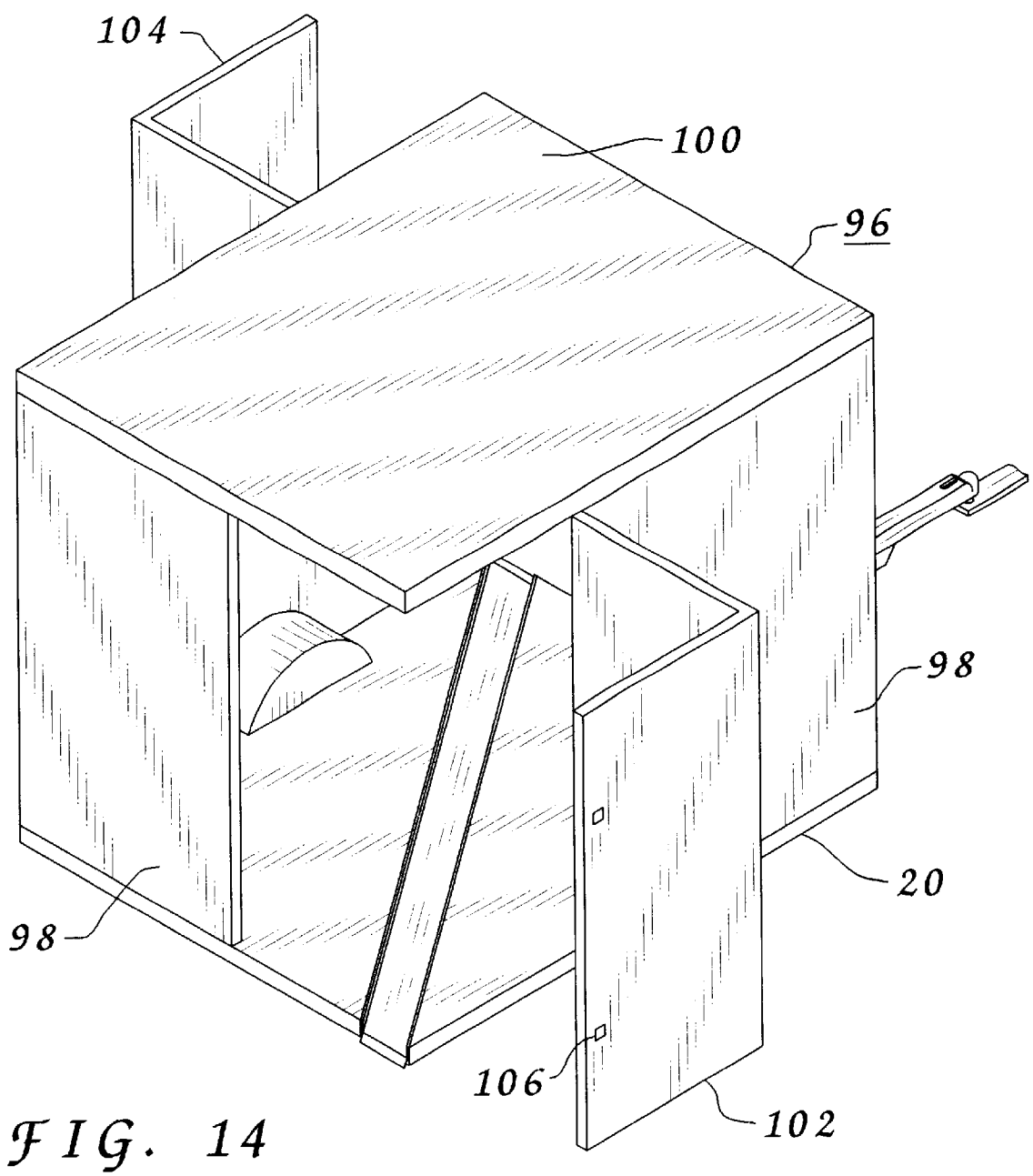
FIG. 14 is a perspective view of the dual tilt trailer shown in FIG. 13 in an open orientation.

FIG. 13 and FIG. 14 depict an enclosed housing 96 having walls 98, a roof 100, a rear door assembly 102 and a front door assembly 104. When rear door assembly 102 is open loading of a movable object, not shown in these views, may readily occur. When front door assembly 104 is open unloading of the movable object may readily occur. Enclosed housing 96 is positioned on dual tilt trailer 20 wherein the movable object may be loaded onto dual tilt trailer 20, stored or transported on dual tilt trailer 20 while securely contained within enclosed housing 96 and unloaded from dual tilt trailer 20. Handles 106 control locks, not shown, to secure rear door assembly 102 and front door assembly 104 respectively.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual tilt trailer to provide for a forward direction of conveyance loading of a movable object onto the dual tilt trailer while the dual tilt trailer is attached behind a tow vehicle and a transport of the movable object upon the dual tilt trailer while the dual tilt trailer remains attached behind the tow vehicle and a forward direction of conveyance unloading of the movable object from the dual tilt trailer while the dual tilt trailer remains attached behind the tow vehicle, the forward direction of conveyance loading and the forward direction of conveyance unloading of the movable object each utilizing a forward motion of the movable object, the dual tilt trailer comprising:

a) a ground support assembly having opposing wheels, the wheels in contact with a ground surface;
   b) a bed assembly attached to the ground support assembly, the bed assembly having a support surface to provide for support of the movable object, the support surface having a first end and a second end stationarily located on opposing sides of the ground support assembly;
   c) a tongue assembly to provide for a subsequent attachment of the dual tilt trailer to the tow vehicle;
   d) a coupling assembly to provide for an attachment of the tongue assembly to the bed assembly, the coupling assembly having:
      1) a transport position to provide for a retention of the support surface of the bed assembly in a generally level orientation;
      2) a first pivoted position to provide for a positioning of the first end of the support surface of the bed assembly in close proximity to the ground surface wherein access from the ground surface is provided to the support surface for the forward direction of conveyance loading of the movable objects n support surface of the bed assembly and wherein the second end of the support surface of the bed assembly is significantly elevated above the ground surface;
      3) a second pivoted position to provide for a positioning of the second end of the support surface of the bed assembly in close proximity to the ground surface wherein access to the ground surface is provided from the support surface for the forward direction of conveyance unloading of the movable object from the support surface of the bed assembly and wherein the first end of the support surface of the bed assembly is significantly elevated above the ground surface.

2. The dual tilt trailer defined in claim 1 wherein the coupling assembly further comprises locking means to provide for a retention of the coupling assembly in the transport position and wherein the bed assembly further comprises a weight distribution bias relative to the ground support assembly wherein the weight distribution bias provides for a movement of the coupling assembly from the transport position to the first pivoted position when the locking means is released.

3. The dual tilt trailer defined in claim 1 wherein the coupling assembly further comprises locking means to provide for a securement of the coupling assembly in the transport position subsequent to a transfer from the first pivoted position to the transport position.

4. The dual tilt trailer defined in claim 1 wherein the coupling assembly further comprises an operator release lever to provide for a release of the coupling assembly from the transport position for subsequent movement of the coupling assembly to the second pivoted position, the operator release lever positioned relative to the bed assembly in close proximity to the movable, object when the movable object is positioned on the dual tilt trailer.

5. The dual tilt trailer defined in claim 1 wherein the first end of the support surface of the bed assembly is distal from the tongue assembly wherein the forward direction of conveyance loading of the movable object occurs distal from the tow vehicle.

6. The dual tilt trailer defined in claim 1 wherein the second end of the support surface of the bed assembly is distal from the tongue assembly wherein the forward direction of conveyance unloading of the movable object occurs distal from the tow vehicle.

7. The dual tilt trailer defined in claim 1 wherein the coupling assembly further comprises:
   a) a pivotal connection wherein the attachment of the tongue assembly is pivotal relative to the bed assembly;
   b) a locking member to provide for an operator control over the pivotal connection for select movement from the transport position to the first pivoted position and from the transport position to the second pivoted position;
   c) an auxiliary locking member to provide for a secure retention of the coupling assembly in the transport position.

8. The dual tilt trailer defined in claim 1 wherein the support surface of the bed assembly further comprises a guide channel into which wheels of the movable object reside during the forward direction of conveyance loading, the transport and the forward direction of conveyance unloading and wherein the guide channel extends generally diagonally across the bed assembly.

9. The dual tilt trailer defined in claim 1 wherein the movable object is a motorcycle.

10. A diagonal retention trailer to provide for a conveyance of a ridable motorized vehicle while the diagonal retention trailer is towed by a tow vehicle, the conveyance of the ridable motorized vehicle on the diagonal retention trailer occurring while the ridable motorized vehicle is retained at an offset angle generally diagonal on the diagonal retention trailer relative to a general direction of conveyance of the diagonal retention trailer by the tow vehicle, the diagonal retention trailer comprising:
   a) a tongue assembly to provide for an attachment of the diagonal retention trailer to the tow vehicle, the tongue assembly having a longitudinal axis therealong;
   b) opposing wheels to provide for a support of the diagonal retention trailer relative to a ground surface, the opposing wheels having an axis therebetween, the axis of the opposing wheels generally perpendicular to the longitudinal axis of the tongue assembly when viewed from above;
   c) a guide channel to provide for a support of the ridable motorized vehicle, the guide channel having a guide channel axis, the guide channel axis angularly offset relative to the longitudinal axis of the tongue assembly when viewed from above and angularly offset relative to the axis of the opposing wheels when viewed from above, the guide channel having a first end and a second end, and wherein the first end of the guide channel and the second end of the guide channel reside on opposing sides of the axis of the opposing wheels and wherein the first end of the guide channel and the second end of the guide channel reside on opposing sides of the longitudinal axis of the tongue assembly;
   d) positioning means to provide for selectively positioning the guide channel in:
      1) a loading titled orientation wherein the first end of the guide channel is in close proximity to the ground surface while the second end of the guide channel is substantially elevated above the ground surface wherein a loading of the ridable motorized vehicle may occur onto the guide channel from the ground surface utilizing the first end of the guide channel while the diagonal retention trailer remains connected to the tow vehicle;
      2) a transport orientation wherein the first end of the guide channel and the second end of the guide channel are relatively evenly elevated above the ground surface wherein a transport of the ridable motorized vehicle may occur during movement of the diagonal retention trailer utilizing the tow vehicle;
      3) an unloading tilted orientation wherein the second end of the guide channel is in close proximity to the ground surface while the first end of the guide channel is substantially elevated above the ground surface wherein an unloading of the ridable motorized vehicle may occur from the guide channel onto the ground surface utilizing the second end of the guide channel while the diagonal retention trailer remains connected to the tow vehicle.

11. The diagonal retention trailer defined in claim 10 wherein the guide channel further comprises a wheel block coupling member and wherein the diagonal retention trailer further comprises a wheel block for selective positioning within the guide channel, the wheel guide block comprising:
   a) a coupling member to selectively engage the wheel block coupling member of the guide channel to provide for retention of the wheel block relative to the guide channel;
   b) an abutment member to provide for a blockage of the guide channel to prevent a passage of the ridable motorized vehicle thereby.

12. The diagonal retention trailer defined in claim 10 further comprising a wheel stop, the wheel stop comprising:
   a) a blocking member positioned within the guide channel in close proximity to the second end;
   b) positioning means to provide for a movement of the blocking member between a blocking orientation and a passage orientation, the blocking orientation preventing passage thereby of a wheel of the ridable motorized vehicle while the wheel is traveling in the guide channel in an operational direction of travel, the operational direction of travel generally from the first end of the guide channel to the second end of the guide channel, the passage orientation permitting passage thereby of the wheel of the ridable motorized vehicle while the wheel is traveling in the guide channel in the operational direction of travel;
   c) release means to provide for an operator controlled transfer of the blocking member between the blocking orientation and the passage orientation.

13. The diagonal retention trailer defined in claim 10 wherein the diagonal retention trailer further comprises an operational orientation along a roadway, the operational orientation having a roadway side along a left side of the diagonal retention trailer while facing forward and a curb side along a right side of the diagonal retention trailer while facing forward and wherein the loading tilted orientation of the positioning means places the first end of the guide channel on the curb side while the unloading tilted orientation of the positioning means places the second end of the guide channel on the roadway side.

14. The diagonal retention trailer defined in claim 10 wherein the guide channel further comprises a base and opposing side walls extending upward from the base.

15. The diagonal retention trailer defined in claim 10 further comprising a housing member, the housing member comprising:
   a) wall members to provide for a protection of a compartment from the environment;
   b) a first door transferable between an open orientation and a closed orientation, the open orientation to provide for an access to the first end of the guide channel to allow for the loading of the ridable motorized vehicle thereon, the closed orientation to provide for securement of the compartment;
   c) a second door transferable between an open orientation and a closed orientation, the open orientation to provide for an access to the second end of the guide channel to allow for the unloading of the ridable motorized vehicle therefrom, the closed orientation to provide for securement of the compartment;
   d) a roof to provide for protection of the compartment from the environment.

16. The diagonal retention trailer defined in claim 10 wherein the ridable motorized vehicle is a motorcycle.

* * * * *